United States Patent Office 3,433,656
Patented Mar. 18, 1969

3,433,656
DENSE REFRACTORY ZIRCONIUM BORIDE BODIES
Walter C. Allen, Stanhope, and Wilbert A. Taebel, Towaco, N.J., assignors to National Beryllia Corp., Haskel, N.J., a corporation of New Jersey
No Drawing. Filed Jan. 20, 1967, Ser. No. 610,493
U.S. Cl. 106—57     3 Claims
Int. Cl. C04b 35/02; H01b 1/02

ABSTRACT OF THE DISCLOSURE

Tungsten metal 1–6%, is added to zirconium diboride powder, 94% or more, whereby dense molded zirconium diboride products are obtained by hot pressing at 1950–2200° C. and at relatively low pressures of 3000 p.s.i. or more.

This invention relates to a dense refractory zirconium boride, $ZrB_2$, body and to the process of making the same.

Zirconium diboride, $ZrB_2$, is a highly refractory ceramic material having very high hardness, good electrical conductivity and good chemical resistance at very high temperatures. The borides, including zirconium diboride, are about the only materials other than the refractory oxides capable of supporting substantial loads under oxidizing conditions at temperatures of around 1650 to 2200° C., for example.

One difficulty connected with the manufacture of zirconium diboride refractory products is that it is difficult to densify to greater than 75% theoretical density by hot-pressing techniques. Kaufman and Clougherty have reported that they have obtained a high density (93–99% of theoretical) product of $ZrB_2$ by hot-pressing in the range of 1800–2000° C. and 30,000 p.s.i. (CA 64, 1722e, (1966)). This pressure at this temperature range, however, is difficult to achieve and maintain.

Among the objects of the invention is to provide an improved process for the production of dense, molded refractory bodies with zirconium diboride as the essential ingredient.

Among other objects of the invention is to provide a process of making molded, refractory, bodies consisting almost entirely of zirconium diboride which are impervious to water and which have a dense metallic appearance.

Among other objects of the invention is to provide an improved dense refractory composition containing over 94% of zirconium diboride.

This invention is based on the discovery that if 6% to less than 1% tungsten metal powder or wire is mixed with zirconium diboride powder a hot-pressed body with a density of 5.6 to 6.23 g./cc. compared with 6.10 to 6.36 theoretical (91 to 98% of theoretical) can be obtained at a pressure of about 3000 to 4000 p.s.i. and a temperature of about 1950 to 2200° C., under the same conditions but without the addition of tungsten, only about 75% of theoretical density is obtained. Although high quality dense bodies are obtained at 3000–4000 p.s.i. pressure, the 4000 p.s.i. is not the maximum pressure that can be employed in the process. Higher pressures also produce high density products.

As would be expected, the dense material is harder, stronger, more oxidation resistant and has greater load carrying capacity than the more porous material and in addition, the dense material is substantially impervious to gases and liquids.

By a process of elimination it is postulated that the result is due to a process which involves the diffusion of tungsten into the $ZrB_2$ so that some boron atoms are shared by the zirconium and tungsten. It is known, for example, that tungsten has a higher melting point than $ZrB_2$. It is also known that when $ZrB_2$ and tungsten metal are mixed in 50—50 mol proportions and heated to 2100° C., no reaction takes place. See Lietnaker et al., J. of the Electrochemical Soc. 109, No. 1, p. 66 (1962). According to said article, zirconium diboride and tungsten was the only mixture tested which failed to show additional phases when heated with tungsten. Inso far as is known, no binary compounds of $ZrB_2$ and W have been reported. In the products made by the present invention no metallic tungsten can be identified microscopically.

The following examples are given to illustrate in detail the method of carrying out the invention. It is to be understood that the specific details given in the examples are not to be considered as limiting the scope of the invention.

Example I

Substantially pure zirconium diboride in powder form with a maximum particle size of about 44 microns was mixed with 6% of tungsten metal powder with a similar particle size. The mixed powder was introduced into a graphite mold and hot-pressed at a temperature of 2100° C. and a gauge pressure of 3000 p.s.i. to provide a cylinder about 25 mm. thick. The mix was retained in the mold under these conditions for about 20 min.

Example II

The process as conducted as in Example I except that instead of employing powdered tungsten, a fine continuous tungsten wire of a weight to provide 1¼% of the total was matted and introduced into the mold with the powdered boride.

The products of Examples I and II when examined in cross section under the microscope show no trace of tungsten metal. The products are impervious to water and air and have a density of 6.01 g./cc. or 97.9% of the theoretical.

The features and principles underlying the invention described above in connection with specific exemplifications will suggest to those skilled in the art many other modifications thereof. It is accordingly desired that the appended claims shall not be limited to any specific feature or details thereof.

We claim:
1. Process of preparing dense refractory bodies with over 94% of zirconium diboride comprising adding about 1 to 6% of tungsten metal to substantially pure zirconium diboride particles and hot-pressing bodies therefrom at a temperature of 1950 to 2200° C. and at a pressure of at least 3000 p.s.i.
2. The process of claim 1 wherein the tungsten is added to the zirconium diboride particles in the form of a fine, continuous wire.
3. As a product of manufacture, a dense refractory molded body consisting essentially of the components zirconium diboride in amounts of about 94 to 99% and tungsten.

References Cited

Tyrrell et al.: Metallic Binders for Zirconium Diboride: Chromium, Molybdenum, and Tungsten, Bureau of Mines Report of Investigations 6549, 1964, 14 pp.

JAMES E. POER, Primary Examiner.

U.S. Cl. X.R.
252—515, 520